US012100409B2

(12) United States Patent
Fuchs et al.

(10) Patent No.: US 12,100,409 B2
(45) Date of Patent: *Sep. 24, 2024

(54) NOISE FILLING WITHOUT SIDE INFORMATION FOR CELP-LIKE CODERS

(71) Applicant: Fraunhofer-Gesellschaft zur Foerderung der angewandten Forschung e.V., Munich (DE)

(72) Inventors: Guillaume Fuchs, Erlangen (DE); Christian Helmrich, Erlangen (DE); Manuel Jander, Erlangen (DE); Benjamin Schubert, Nuremberg (DE); Yoshikazu Yokotani, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 105 days.

This patent is subject to a terminal disclaimer.

(21) Appl. No.: 17/103,609

(22) Filed: Nov. 24, 2020

(65) Prior Publication Data

US 2021/0074307 A1 Mar. 11, 2021

Related U.S. Application Data

(63) Continuation of application No. 16/286,445, filed on Feb. 26, 2019, now Pat. No. 10,984,810, which is a (Continued)

(51) Int. Cl.

*G10L 19/087* (2013.01)
*G10L 19/002* (2013.01)

(Continued)

(52) U.S. Cl.

CPC .......... *G10L 19/087* (2013.01); *G10L 19/002* (2013.01); *G10L 19/028* (2013.01); *G10L 19/12* (2013.01)

(58) Field of Classification Search

None

See application file for complete search history.

(56) References Cited

U.S. PATENT DOCUMENTS 6,691,085 B1 * 2/2004 Rotola-Pukkila ........................ G10L 21/0364 704/214
7,991,621 B2 8/2011 Oh et al.

(Continued)

FOREIGN PATENT DOCUMENTS

CN 1395724 A 2/2003
CN 1484824 A 3/2004

(Continued)

OTHER PUBLICATIONS

"Universal Mobile Telecommunications System (UMTS); Mandatory Speech Codec speech processing functions AMR Wideband speech codec; Transcoding functions", ETSI TS 126 190 V5.1.0 (Dec. 2001); 3GPP TS 26.190 version 5.1.0 Release 5;Universal Mobile Telecommunications System (UMTS); Mandatory Speech Codec speech processing functions AMR Wideband speech codec; Transcoding functions (3GPP TS 26.190 version 5.1.0 Release 5), Dec. 2001, 55 pp.

(Continued)

*Primary Examiner* — Douglas Godbold

(74) *Attorney, Agent, or Firm* — PERKINS COIE LLP; Michael A. Glenn

(57) ABSTRACT

An audio decoder provides a decoded audio information on the basis of an encoded audio information including linear prediction coefficients (LPC) and includes a tilt adjuster to adjust a tilt of a noise using linear prediction coefficients of a current frame to acquire a tilt information and a noise inserter configured to add the noise to the current frame in dependence on the tilt information. Another audio decoder includes a noise level estimator to estimate a noise level for (Continued)

a current frame using a linear prediction coefficient of at least one previous frame to acquire a noise level information; and a noise inserter to add a noise to the current frame in dependence on the noise level information provided by the noise level estimator. Thus, side information about a background noise in the bit-stream may be omitted. Methods and computer programs serve a similar purpose.

19 Claims, 9 Drawing Sheets

Related U.S. Application Data continuation of application No. 14/811,778, filed on Jul. 28, 2015, now Pat. No. 10,269,365, which is a continuation of application No. PCT/EP2014/051649, filed on Jan. 28, 2014.

(60) Provisional application No. 61/758,189, filed on Jan. 29, 2013.

(51) Int. Cl.
*G10L 19/028* (2013.01)
*G10L 19/12* (2013.01)

(56) References Cited

U.S. PATENT DOCUMENTS

| | | | | |
|---|---|---|---|---|
| 10,269,365 | B2 * | 4/2019 | Fuchs | G10L 19/028 |
| 10,984,810 | B2 * | 4/2021 | Fuchs | G10L 19/12 |
| 2003/0009326 | A1 * | 1/2003 | Wang | G10L 21/0364 704/E21.009 |
| 2008/0027716 | A1 * | 1/2008 | Rajendran | G10L 19/012 704/E19.006 |
| 2009/0265167 | A1 * | 10/2009 | Ehara | G10L 19/265 704/226 |
| 2010/0070284 | A1 | 3/2010 | Oh et al. | |
| 2010/0098199 | A1 * | 4/2010 | Oshikiri | G10L 19/26 375/350 |
| 2010/0286991 | A1 | 11/2010 | Hedelin et al. | |
| 2011/0099018 | A1 | 4/2011 | Neuendorf et al. | |
| 2011/0173008 | A1 | 7/2011 | Lecomte et al. | |
| 2011/0173011 | A1 | 7/2011 | Geiger et al. | |
| 2011/0178795 | A1 | 7/2011 | Bayer et al. | |
| 2011/0202352 | A1 * | 8/2011 | Neuendorf | G10L 21/038 704/E19.01 |
| 2012/0046955 | A1 * | 2/2012 | Rajendran | G10L 19/028 704/500 |
| 2012/0271644 | A1 * | 10/2012 | Bessette | G10L 19/03 704/E19.035 |
| 2013/0030798 | A1 * | 1/2013 | Mittal | G10L 19/20 704/219 |
| 2013/0282368 | A1 * | 10/2013 | Choo | G10L 21/038 704/219 |

FOREIGN PATENT DOCUMENTS

| | | | |
|---|---|---|---|
| CN | 101925950 | A | 12/2010 |
| CN | 102089758 | A | 6/2011 |
| CN | 102105930 | A | 6/2011 |
| CN | 102144259 | A | 8/2011 |
| CN | 102150201 | A | 8/2011 |
| EP | 1328927 | B1 | 5/2007 |
| EP | 2077551 | A1 | 7/2009 |
| JP | 2000235400 | A | 8/2000 |
| JP | 2004537739 | A | 12/2004 |
| RU | 2237296 | C2 | 9/2004 |
| RU | 2011114933 | A1 | 9/2011 |
| RU | 2455709 | C2 | 7/2012 |
| TW | 201124981 | A | 7/2011 |
| WO | 2010003663 | A1 | 1/2010 |
| WO | 2010040522 | A2 | 4/2010 |
| WO | 2011048094 | A1 | 4/2011 |
| WO | 2011063694 | A1 | 6/2011 |
| WO | 2012110476 | A1 | 8/2012 |

OTHER PUBLICATIONS

Benyassine, Adil , et al., "ITU-T Recommendation G.729 Annex B: A silence compression Scheme for use with G.729 optimized for V.70 Digital simultaneous voice and data applications", IEEE Communication Magazine, vol. 35, No. 9; IEEE Service Center, Piscataway, NJ, pp. 64-73.
Bessette, Bruno , et al., "The Adaptive Multirate Wideband Speech Codec (AMR-WB)", IEEE Transactions on Speech and Audio Processing, IEEE Service Center. New York. vol. 10, No. 8., pp. 620-636.
Hendriks, Richard C, et al., "MMSE based noise PSD tracking with low complexity", IEEE Int. Conf. Acoustics, Speech, and Signal Processing;, Mar. 2010, pp. 4266-4269.
ITU-T, G.718 , "Frame Error Robust Narrow-Band and Wideband Embedded Variable Bit-Rate Coding of Speech and Audio from 8-32 kbit/s", Series G: Transmission Systems and Media, Digital Systems and Networks, Recommendation ITU-T G.718, Telecommunication Standardization Sector of ITU, Jun. 2008, 257 pages.
Jelinek, Milan , et al., "Wideband Speech Coding Advances in VMR-WB Standard", IEEE Transactions on Audio, Speech, and Language Processing, vol. 15, No. 4, pp. 1167-1179.
Makinen, Jari , et al., "AMR-WB+: a New Audio Coding Standard for 3rd Generation Mobile Audio Services", 2005 IEEE International Conference on Acoustics, Speech, and Signal Processing. Philadelphia, PA, USA., 1109-1112.
Martin, Rainer , "Noise Power Spectral Density Estimation Based on Optimal Smoothing and Minimum Statistics", IEEE Transactions on Speech and Audio Processing, vol. 9, No. 5, pp. 504-512.
Neuendorf, Max , et al., "MPEG Unified Speech and Audio Coding—The ISO/MPEG Standard for High-Efficiency Audio Coding of all Content Types", Audio Engineering Society Convention Paper 8654, Presented at the 132nd Convention, pp. 1-22.
Quackenbush, Schuyler , "The MPEG Representation of Digital Media", Springer New York, pp. 141-159.
Vaillancourt, Tommy , et al., "ITU-T EV-VBR: A Robust 8-32 kbit/s Scalable Coder for Error Prone Telecommunications Channels", In Proc. EUSIPCO 2008, Lausanne, Switzerland, 5 pages.

* cited by examiner

NOISE FILLING WITHOUT SIDE INFORMATION FOR CELP-LIKE CODERS

CROSS-REFERENCE TO RELATED APPLICATIONS

This application is a continuation U.S. patent application Ser. No. 16/286,445, filed Feb. 26, 2019, which is a continuation U.S. patent application Ser. No. 14/811,778, filed Jul. 28, 2015, now U.S. Pat. No. 10,269,365, issued Apr. 23, 2019, which is a continuation of International Application No. PCT/EP2014/051649, filed Jan. 28, 2014, which claims priority from U.S. Provisional Application No. 61/758,189, filed Jan. 29, 2013, which are each incorporated herein in its entirety by this reference thereto.

Embodiments of the invention refer to an audio decoder for providing a decoded audio information on the basis of an encoded audio information comprising linear prediction coefficients (LPC), to a method for providing a decoded audio information on the basis of an encoded audio information comprising linear prediction coefficients (LPC), to a computer program for performing such a method, wherein the computer program runs on a computer, and to an audio signal or a storage medium having stored such an audio signal, the audio signal having been treated with such a method.

BACKGROUND OF THE INVENTION

Low-bit-rate digital speech coders based on the code-excited linear prediction (CELP) coding principle generally suffer from signal sparseness artifacts when the bit-rate falls below about 0.5 to 1 bit per sample, leading to a somewhat artificial, metallic sound. Especially when the input speech has environmental noise in the background, the low-rate artifacts are clearly audible: the background noise will be attenuated during active speech sections. The present invention describes a noise insertion scheme for (A)CELP coders such as AMR-WB [1] and G.718 [4, 7] which, analogous to the noise filling techniques used in transform based coders such as xHE-AAC [5, 6], adds the output of a random noise generator to the decoded speech signal to reconstruct the background noise.

The International publication WO 2012/110476 A1 shows an encoding concept which is linear prediction based and uses spectral domain noise shaping. A spectral decomposition of an audio input signal into a spectrogram comprising a sequence of spectra is used for both linear prediction coefficient computation as well as the input for frequency-domain shaping based on the linear prediction coefficients. According to the cited document an audio encoder comprises a linear prediction analyzer for analyzing an input audio signal so as to derive linear prediction coefficients therefrom. A frequency-domain shaper of an audio encoder is configured to spectrally shape a current spectrum of the sequence of spectra of the spectrogram based on the linear prediction coefficients provided by linear prediction analyzer. A quantized and spectrally shaped spectrum is inserted into a data stream along with information on the linear prediction coefficients used in spectral shaping so that, at the decoding side, the de-shaping and de-quantization may be performed. A temporal noise shaping module can also be present to perform a temporal noise shaping.

In view of conventional technology there remains a demand for an improved audio decoder, an improved method, an improved computer program for performing such a method and an improved audio signal or a storage medium having stored such an audio signal, the audio signal having been treated with such a method. More specifically, it is desirable to find solutions improving the sound quality of the audio information transferred in the encoded bit-stream.

SUMMARY

The reference signs in the claims and in the detailed description of embodiments of the invention were added to merely improve readability and are in no way meant to be limiting.

According to an embodiment, an audio decoder for providing a decoded audio information on the basis of an encoded audio information including linear prediction coefficients (LPC) may have:

- a tilt adjuster configured to adjust a tilt of a background noise, wherein the tilt adjuster is configured to use linear prediction coefficients of a current frame to acquire a tilt information; and
- a noise level estimator; and
- a decoder core configured to decode an audio information of the current frame using the linear prediction coefficients of the current frame to acquire a decoded core coder output signal; and
- a noise inserter configured to add the adjusted background noise to the current frame, to perform a noise filling.

According to another embodiment, an audio decoder for providing a decoded audio information on the basis of an encoded audio information including linear prediction coefficients (LPC), may have:

- a noise level estimator configured to estimate a noise level for a current frame using a plurality of linear prediction coefficients of at least one previous frame to acquire a noise level information; and
- a noise inserter configured to add a noise to the current frame in dependence on the noise level information provided by the noise level estimator;

wherein the audio decoder is adapted to decode an excitation signal of the current frame and to compute its root mean square $e_{rms}$;

wherein the audio decoder is adapted to compute a peak level p of a transfer function of an LPC filter of the current frame;

wherein the audio decoder is adapted to compute a spectral minimum $m_f$ of the current audio frame by computing the quotient of the root mean square $e_{rms}$ and the peak level p to acquire the noise level information;

wherein the noise level estimator is adapted to estimate the noise level on the basis of two or more quotients of different audio frames;

wherein the audio decoder includes a decoder core configured to decode an audio information of the current frame using linear prediction coefficients of the current frame to acquire a decoded core coder output signal and wherein the noise inserter adds the noise depending on linear prediction coefficients used in decoding the audio information of the current frame and used in decoding the audio information of one or more previous frames.

According to another embodiment, a method for providing a decoded audio information on the basis of an encoded audio information including linear prediction coefficients (LPC) may have the steps of:

- estimating a noise level;
- adjusting a tilt of a background noise, wherein linear prediction coefficients of a current frame are used to acquire a tilt information; and decoding an audio information of the current frame using the linear prediction coefficients of the current frame to acquire a decoded core coder output signal; and adding the adjusted background noise to the current frame, to perform a noise filling.

Another embodiment may have a computer program for performing a method according to claim 16, wherein the computer program runs on a computer.

According to another embodiment, a method for providing a decoded audio information on the basis of an encoded audio information including linear prediction coefficients (LPC) may have the steps of:

estimating a noise level for a current frame using a plurality of linear prediction coefficients of at least one previous frame to acquire a noise level information; and adding a noise to the current frame in dependence on the noise level information provided by the noise level estimation;

wherein an excitation signal of the current frame is decoded and wherein its root mean square $e_{rms}$ is computed;

wherein a peak level p of a transfer function of an LPC filter of the current frame is computed;

wherein a spectral minimum $m_f$ of the current audio frame is computed by computing the quotient of the root mean square $e_{rms}$ and the peak level p to acquire the noise level information;

wherein the noise level is estimated on the basis of two or more quotients of different audio frames;

wherein the method includes decoding an audio information of the current frame using linear prediction coefficients of the current frame to acquire a decoded core coder output signal and wherein the method includes adding the noise depending on linear prediction coefficients used in decoding the audio information of the current frame and used in decoding the audio information of one or more previous frames.

Another embodiment may have a computer program for performing a method according to claim 18, wherein the computer program runs on a computer.

The suggested solutions avoid having to provide a side information in the CELP bitstream in order to adjust noise provided on the decoder side during a noise filling process. This means that the amount of data to be transported with the bitstream may be reduced while the quality of the inserted noise can be increased merely on the basis of linear prediction coefficients of the currently or previously decoded frames. In other words, side information concerning the noise which would increase the amount of data to be transferred with the bitstream may be omitted. The invention allows to provide a low-bit-rate digital coder and a method which may consume less bandwidth concerning the bitstream and provide an improved quality of the background noise in comparison to conventional-technology solutions.

It is advantageous that the audio decoder comprises a frame type determinator for determining a frame type of the current frame, the frame type determinator being configured to activate the tilt adjuster to adjust the tilt of the noise when the frame type of the current frame is detected to be of a speech type. In some embodiments, the frame type determinator is configured to recognize a frame as being a speech type frame when the frame is ACELP or CELP coded. Shaping the noise according to the tilt of the current frame may provide a more natural background noise and may reduce unwanted effects of audio compression with regard to the background noise of the wanted signal encoded in the bitstream. As those unwanted compression effects and artifacts often become noticeable with respect to background noise of speech information, it can be advantageous to enhance the quality of the noise to be added to such speech type frames by adjusting the tilt of the noise before adding the noise to the current frame. Accordingly, the noise inserter may be configured to add the noise to the current frame only if the current frame is a speech frame, since it may reduce the workload on the decoder side if only speech frames are treated by noise filling. In an advantageous embodiment of the invention, the tilt adjuster is configured to use a result of a first-order analysis of the linear prediction coefficients of the current frame to obtain the tilt information. By using such a first-order analysis of the linear prediction coefficients it becomes possible to omit side information for characterizing the noise in the bitstream. Moreover, the adjustment of the noise to be added can be based on the linear prediction coefficients of the current frame which have to be transferred with the bitstream anyway to allow a decoding of the audio information of the current frame. This means that the linear prediction coefficients of the current frame are advantageously re-used in the process of adjusting the tilt of the noise. Furthermore, a first-order analysis is reasonably simple so that the computational complexity of the audio decoder does not increase significantly.

In some embodiments of the invention, the tilt adjuster is configured to obtain the tilt information using a calculation of a gain g of the linear prediction coefficients of the current frame as the first order analysis. More advantageously, the gain g is given by the formula $g=\Sigma[a_k \cdot a_{k+1}]/\Sigma[a_k \cdot a_k]$, wherein $a_k$ are LPC coefficients of the current frame. In some embodiments, two or more LPC coefficients $a_k$ are used in the calculation. Advantageously, a total of 16 LPC coefficients are used, so that k=0 . . . 15. In embodiments of the invention, the bitstream may be coded with more or less than 16 LPC coefficients. As the linear prediction coefficients of the current frame are readily present in the bitstream, the tilt information can be obtained without making use of side information, thus reducing the amount of data to be transferred in the bitstream. The noise to be added may be adjusted merely by using linear prediction coefficients which may be used for decoding the encoded audio information.

Advantageously, the tilt adjuster is configured to obtain the tilt information using a calculation of a transfer function of the direct form filter $x(n)-g\cdot x(n-1)$ for the current frame. This type of calculation is reasonably easy and does not need a high computing power on the decoder side. The gain g may be calculated easily from the LPC coefficients of the current frame, as shown above. This allows to improve noise quality for low-bit-rate digital coders while using purely bitstream data essential for decoding the encoded audio information.

In an advantageous embodiment of the invention, the noise inserter is configured to apply the tilt information of the current frame to the noise in order to adjust the tilt of the noise before adding the noise to the current frame. If the noise inserter is configured accordingly, a simplified audio decoder may be provided. By first applying the tilt information and then adding the adjusted noise to the current frame, a simple and effective method of an audio decoder may be provided.

In an embodiment of the invention, the audio decoder furthermore comprises a noise level estimator configured to estimate a noise level for a current frame using a linear prediction coefficient of at least one previous frame to obtain a noise level information, and a noise inserter configured to add a noise to the current frame in dependence on the noise level information provided by the noise level estimator. By this, the quality of the background noise and thus the quality of the whole audio transmission may be enhanced as the noise to be added to the current frame can be adjusted according to the noise level which is probably present in the current frame. For example, if a high noise level is expected in the current frame because a high noise level was estimated from previous frames, the noise inserter may be configured to increase the level of the noise to be added to the current frame before adding it to the current frame. Thus, the noise to be added can be adjusted to be neither too silent nor too loud in comparison with the expected noise level in the current frame. This adjustment, again, is not based on dedicated side information in the bistream but merely uses information of useful data transferred in the bitstream, in this case a linear prediction coefficient of at least one previous frame which also provides information about a noise level in a previous frame. Thus, it is advantageous that the noise to be added to the current frame is shaped using the g derived tilt and scaled in view of a noise level estimate. Most advantageously, the tilt and the noise level of the noise to be added to the current frame are adjusted when the current frame is of a speech type. In some embodiments, the tilt and/or the noise level to be added to the current frame are adjusted also when the current frame is of a general audio type, for example a TCX or a DTX type.

Advantageously, the audio decoder comprises a frame type determinator for determining a frame type of the current frame, the frame type determinator being configured to identify whether the frame type of the current frame is speech or general audio, so that the noise level estimation can be performed depending on the frame type of the current frame. For example, the frame type determinator can be configured to detect whether the current frame is a CELP or ACELP frame, which is a type of speech frame, or a TCX/MDCT or DTX frame, which are types of general audio frames. Since those coding formats follow different principles, it is desirable to determine the frame type before performing the noise level estimation so that suitable calculations can be chosen, depending on the frame type.

In some embodiments of the invention the audio decoder is adapted to compute a first information representing a spectrally unshaped excitation of the current frame and to compute a second information regarding spectral scaling of the current frame to compute a quotient of the first information and the second information to obtain the noise level information. By this, the noise level information may be obtained without making use of any side information. Thus, the bit rate of the coder may be kept low.

Advantageously, the audio decoder is adapted to decode an excitation signal of the current frame and to compute its root mean square $e_{rms}$ from the time domain representation of the current frame as the first information to obtain the noise level information under the condition that the current frame is of a speech type. It is advantageous for this embodiment that the audio decoder is adapted to perform accordingly if the current frame is of a CELP or ACELP type. The spectrally flattened excitation signal (in perceptual domain) is decoded from the bitstream and used to update a noise level estimate. The root mean square $e_{rms}$ of the excitation signal for the current frame is computed after the bitstream is read. This type of computation may need no high computing power and thus may even be performed by audio decoders with low computing powers.

In an advantageous embodiment the audio decoder is adapted to compute a peak level p of a transfer function of an LPC filter of the current frame as a second information, thus using a linear prediction coefficient to obtain the noise level information under the condition that the current frame is of a speech type. Again, it is advantageous that the current frame is of the CELP or ACELP type. Computing the peak level p is rather inexpensive, and by re-using linear prediction coefficients of the current frame, which are also used to decode the audio information contained in that frame, side information may be omitted and still background noise may be enhanced without increasing the data rate of the bitstream.

In an advantageous embodiment of the invention, the audio decoder is adapted to compute a spectral minimum $m_f$ of the current audio frame by computing the quotient of the root mean square $e_{rms}$ and the peak level p to obtain the noise level information under the condition that the current frame is of the speech type. This computation is rather simple and may provide a numerical value that can be useful in estimating the noise level over a range of multiple audio frames. Thus, the spectral minimum $m_f$ of a series of current audio frames may be used to estimate the noise level during the time period covered by that series of audio frames. This may allow to obtain a good estimation of a noise level of a current frame while keeping the complexity reasonably low. The peak level p is advantageously calculated using the formula $p=\Sigma|a_k|$, wherein $a_k$ are linear prediction coefficients with $k=0 \ldots 15$, advantageously. Thus, if the frame comprises 16 linear prediction coefficients, p is in some embodiments calculated by summing up over the amplitudes of the advantageously 16 $a_k$.

Advantageously the audio decoder is adapted to decode an unshaped MDCT-excitation of the current frame and to compute its root means square $e_{rms}$ from the spectral domain representation of the current frame to obtain the noise level information as the first information if the current frame is of a general audio type. This is the advantageous embodiment of the invention whenever the current frame is not a speech frame but a general audio frame. A spectral domain representation in MDCT or DTX frames is largely equivalent to the time domain representation in speech frames, for example CELP or (A)CELP frames. A difference lies in that MDCT does not take into account Parseval's theorem. Thus, advantageously the root means square $e_{rms}$ for a general audio frame is computed in a similar manner as the root means square $e_{rms}$ for speech frames. It is then advantageous to calculate the LPC coefficients equivalents of the general audio frame as laid out in WO 2012/110476 A1, for example using an MDCT power spectrum which refers to the square of MDCT values on a bark scale. In an alternative embodiment, the frequency bands of the MDCT power spectrum can have a constant width so that the scale of the spectrum corresponds to a linear scale. With such a linear scale the calculated LPC coefficient equivalents are similar to an LPC coefficient in the time domain representation of the same frame, as, for example, calculated for an ACELP or CELP frame. Furthermore, it is advantageous that, if the current frame is of a general audio type, the peak level p of the transfer function of an LPC filter of the current frame being calculated from the MDCT frame as laid out in the WO 2012/110476 A1 is computed as a second information, thus using a linear prediction coefficient to obtain the noise level information under the condition that the current frame is of a general audio type. Then, if the current frame is of a general audio type, it is advantageous to compute the spectral minimum of the current audio frame by computing the quotient of the root means square $e_{rms}$ and the peak level p to obtain the noise level information under the condition that the current frame is of a general audio type. Thus, a quotient describing the spectral minimum $m_f$ of a current audio frame can be obtained regardless if the current frame is of a speech type or of a general audio type.

In an advantageous embodiment, the audio decoder is adapted to enqueue the quotient obtained from the current audio frame in the noise level estimator regardless of the frame type, the noise level estimator comprising a noise level storage for two or more quotients obtained from different audio frames. This can be advantageous if the audio decoder is adapted to switch between decoding of speech frames and decoding of general audio frames, for example when applying a low-delay unified speech and audio decoding (LD-USAC, EVS). By this, an average noise level over multiple frames may be obtained, disregarding the frame type. Advantageously a noise level storage can hold ten or more quotients obtained from ten or more previous audio frames. For example, the noise level storage may contain room for the quotients of 30 frames. Thus, the noise level may be calculated for an extended time preceding the current frame. In some embodiments, the quotient may only be enqueued in the noise level estimator when the current frame is detected to be of a speech type. In other embodiments, the quotient may only be enqueued in the noise level estimator when the current frame is detected to be of a general audio type.

It is advantageous that the noise level estimator is adapted to estimate the noise level on the basis of statistical analysis of two or more quotients of different audio frames. In an embodiment of the invention, the audio decoder is adapted to use a minimum mean squared error based noise power spectral density tracking to statistically analyse the quotients. This tracking is described in the publication of Hendriks, Heusdens and Jensen [2]. If the method according to [2] shall be applied, the audio decoder is adapted to use a square root of a track value in the statistical analysis, as in the present case the amplitude spectrum is searched directly. In another embodiment of the invention, minimum statistics as known from [3] are used to analyze the two or more quotients of different audio frames.

In an advantageous embodiment, the audio decoder comprises a decoder core configured to decode an audio information of the current frame using a linear prediction coefficient of the current frame to obtain a decoded core coder output signal and the noise inserter adds the noise depending on a linear prediction coefficient used in decoding the audio information of the current frame and/or used when decoding the audio information of one or more previous frames. Thus, the noise inserter makes use of the same linear prediction coefficients that are used for decoding the audio information of the current frame. Side information in order to instruct the noise inserter may be omitted.

Advantageously, the audio decoder comprises a de-emphasis filter to de-emphasize the current frame, the audio decoder being adapted to apply the de-emphasis filter on the current frame after the noise inserter added the noise to the current frame. Since the de-emphasis is a first order IIR boosting low frequencies, this allows for low-complexity, steep IIR high-pass filtering of the added noise avoiding audible noise artifacts at low frequencies.

Advantageously, the audio decoder comprises a noise generator, the noise generator being adapted to generate the noise to be added to the current frame by the noise inserter. Having a noise generator included to the audio decoder can provide a more convenient audio decoder as no external noise generator is necessary. In the alternative, the noise may be supplied by an external noise generator, which may be connected to the audio decoder via an interface. For example, special types of noise generators may be applied, depending on the background noise which is to be enhanced in the current frame.

Advantageously, the noise generator is configured to generate a random white noise. Such a noise resembles common background noises adequately and such a noise generator may be provided easily.

In an advantageous embodiment of the invention, the noise inserter is configured to add the noise to the current frame under the condition that the bit rate of the encoded audio information is smaller than 1 bit per sample. Advantageously the bit rate of the encoded audio information is smaller than 0.8 bit per sample. It is even more advantageous that the noise inserter is configured to add the noise to the current frame under the condition that the bit rate of the encoded audio information is smaller than 0.5 bit per sample.

In an advantageous embodiment, the audio decoder is configured to use a coder based on one or more of the coders AMR-WB, G.718 or LD-USAC (EVS) in order to decode the coded audio information. Those are well-known and wide spread (A)CELP coders in which the additional use of such a noise filling method may be highly advantageous.

BRIEF DESCRIPTION OF THE DRAWINGS

Embodiments of the present invention will be detailed subsequently referring to the appended drawings, in which.

DETAILED DESCRIPTION OF THE INVENTION

The invention is described in detail with regards to the FIGS. 1 to 9. The invention is in no way meant to be limited to the shown and described embodiments.

Figure 1:
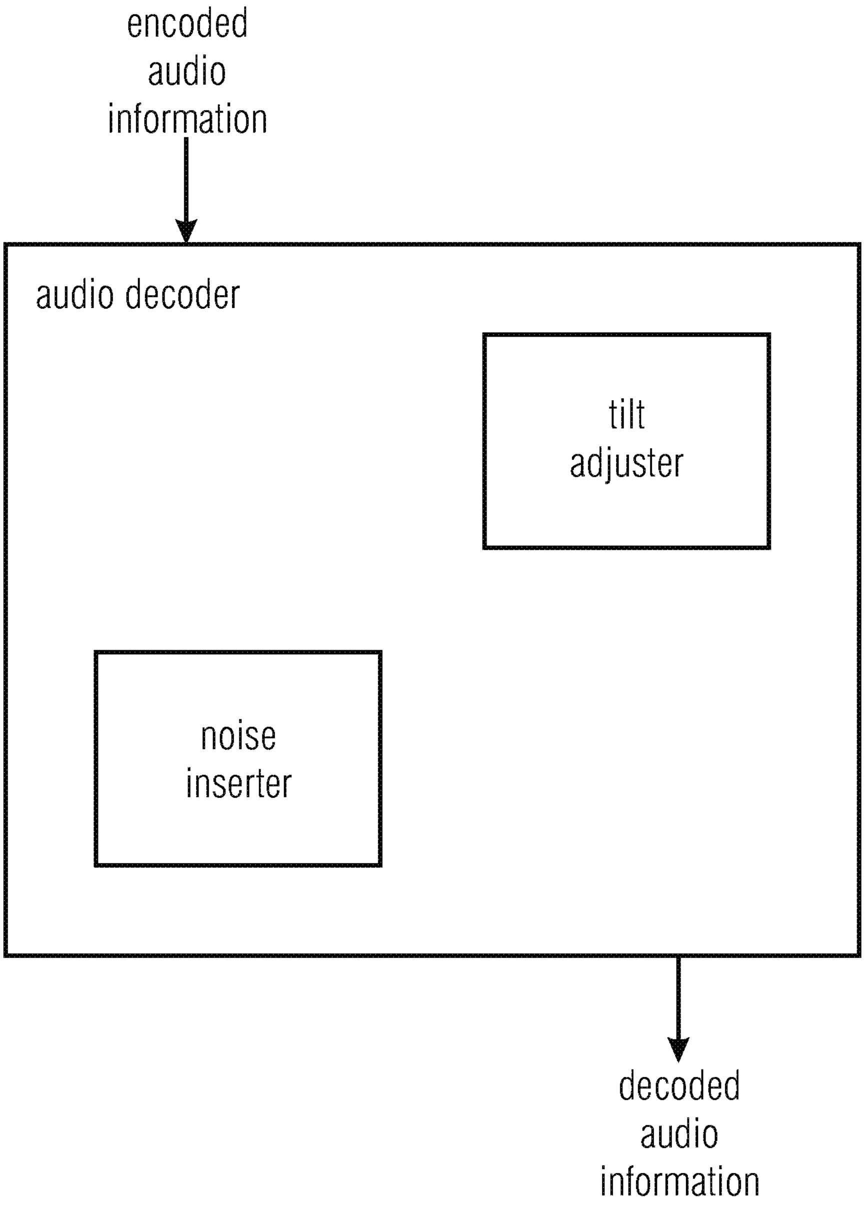
FIG. 1 shows a first embodiment of an audio decoder according to the present invention.

FIG. 1 shows a first embodiment of an audio decoder according to the present invention. The audio decoder is adapted to provide a decoded audio information on the basis of an encoded audio information. The audio decoder is configured to use a coder which may be based on AMR-WB, G.718 and LD-USAC (EVS) in order to decode the encoded audio information. The encoded audio information comprises linear prediction coefficients (LPC), which may be individually designated as coefficients $a_k$ The audio decoder comprises a tilt adjuster configured to adjust a tilt of a noise using linear prediction coefficients of a current frame to obtain a tilt information and a noise inserter configured to add the noise to the current frame in dependence on the tilt information obtained by the tilt calculator. The noise inserter is configured to add the noise to the current frame under the condition that the bitrate of the encoded audio information is smaller than 1 bit per sample. Furthermore, the noise inserter may be configured to add the noise to the current frame under the condition that the current frame is a speech frame. Thus, noise may be added to the current frame in order to improve the overall sound quality of the decoded audio information which may be impaired due to coding artifacts, especially with regards to background noise of speech information. When the tilt of the noise is adjusted in view of the tilt of the current audio frame, the overall sound quality may be improved without depending on side information in the bitstream. Thus, the amount of data to be transferred with the bit-stream may be reduced.

Figure 2:
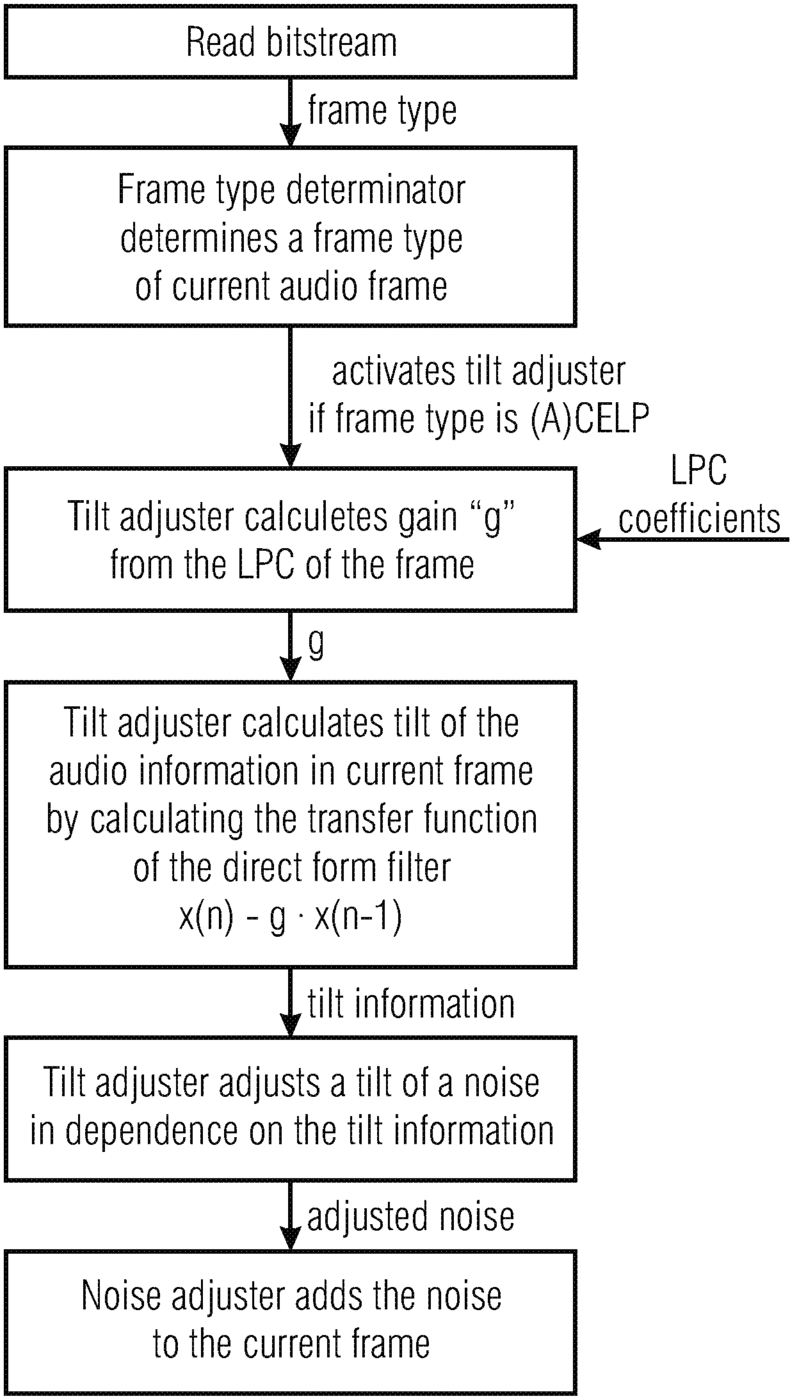
FIG. 2 shows a first method for performing audio decoding according to the present invention which can be performed by an audio decoder according to FIG. 1.
Figure 8:
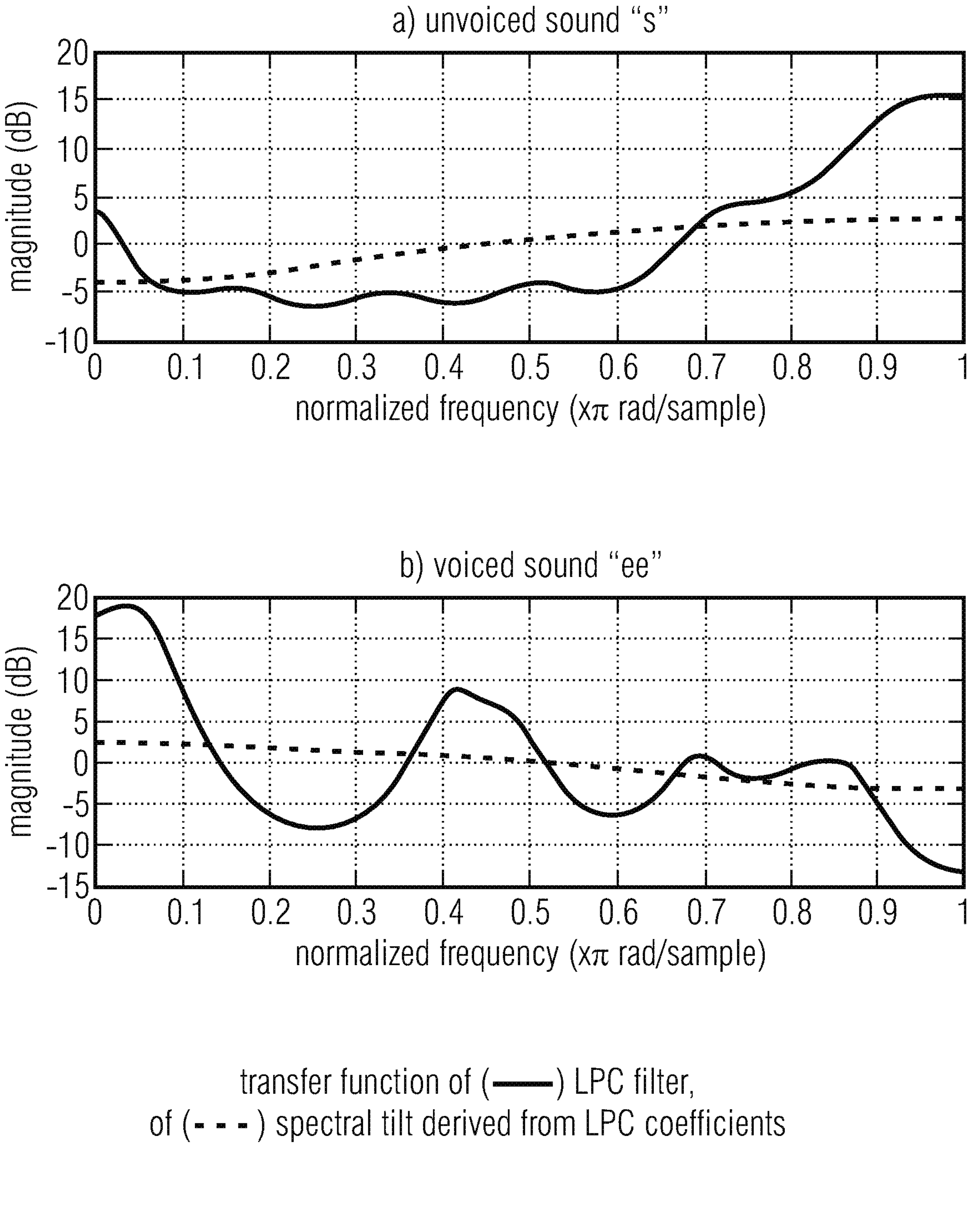
FIG. 8 shows a diagram illustrating a tilt derived from LPC coefficients.

FIG. 2 shows a first method for performing audio decoding according to the present invention which can be performed by an audio decoder according to FIG. 1. Technical details of the audio decoder depicted in FIG. 1 are described along with the method features. The audio decoder is adapted to read the bitstream of the encoded audio information. The audio decoder comprises a frame type determinator for determining a frame type of the current frame, the frame type determinator being configured to activate the tilt adjuster to adjust the tilt of the noise when the frame type of the current frame is detected to be of a speech type. Thus, the audio decoder determines the frame type of the current audio frame by applying the frame type determinator. If the current frame is an ACELP frame, the frame type determinator activates the tilt adjuster. The tilt adjuster is configured to use a result of a first-order analysis of the linear prediction coefficients of the current frame to obtain the tilt information. More specifically, the tilt adjuster calculates a gain g using the formula $g=\Sigma[a_k \cdot a_{k+1}]/\Sigma[a_k \cdot a_k]$ as a first-order analysis, wherein $a_k$ are LPC coefficients of the current frame. FIG. 8 shows a diagram illustrating a tilt derived from LPC coefficients. FIG. 8 shows two frames of the word "see". For the letter "s", which has a high amount of high frequencies, the tilt goes up. For the letters "ee", which have a high amount of low frequencies, the tilt goes down. The spectral tilt shown in FIG. 8 is the transfer function of the direct form filter $x(n)-g \cdot x(n-1)$, g being defined as given above. Thus, the tilt adjuster makes use of the LPC coefficients provided in the bitstream and used to decode the encoded audio information. Side information may be omitted accordingly which may reduce the amount of data to be transferred with the bitstream. Furthermore, the tilt adjuster is configured to obtain the tilt information using a calculation of a transfer function of the direct form filter $x(n)-g \cdot x(n-1)$. Accordingly, the tilt adjuster calculates the tilt of the audio information in the current frame by calculating the transfer function of the direct form filter $x(n)-g \cdot x(n-1)$ using the previously calculated gain g. After the tilt information is obtained, the tilt adjuster adjusts the tilt of the noise to be added to the current frame in dependence on the tilt information of the current frame. After that, the adjusted noise is added to the current frame. Furthermore, which is not shown in FIG. 2, the audio decoder comprises a de-emphasis filter to de-emphasize the current frame, the audio decoder being adapted to apply the de-emphasis filter on the current frame after the noise inserter added the noise to the current frame. After de-emphasizing the frame, which also serves as a low-complexity, steep IIR high-pass filtering of the added noise, the audio decoder provides the decoded audio information. Thus, the method according to FIG. 2 allows to enhance the sound quality of an audio information by adjusting the tilt of a noise to be added to a current frame in order to improve the quality of a background noise.

Figure 3:
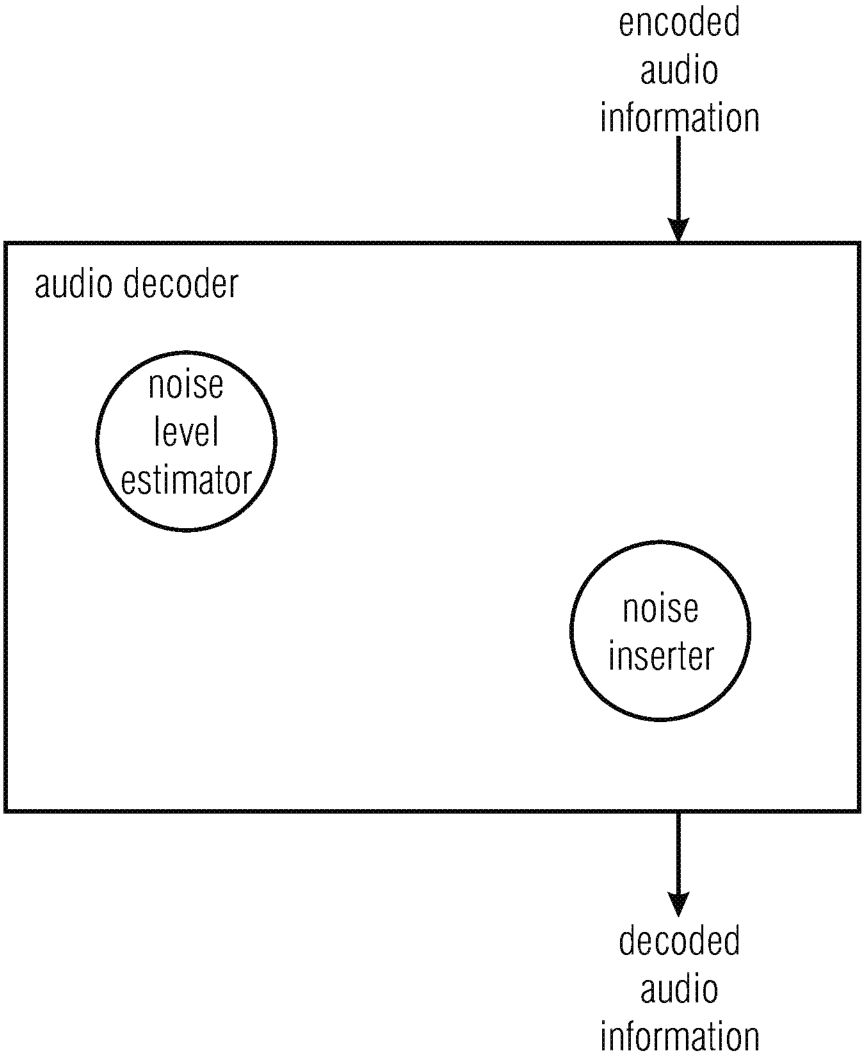
FIG. 3 shows a second embodiment of an audio decoder according to the present invention.

FIG. 3 shows a second embodiment of an audio decoder according to the present invention. The audio decoder is again adapted to provide a decoded audio information on the basis of an encoded audio information. The audio decoder again is configured to use a coder which may be based on AMR-WB, G.718 and LD-USAC (EVS) in order to decode the encoded audio information. The encoded audio information again comprises linear prediction coefficients (LPC), which may be individually designated as coefficients $a_k$. The audio decoder according to the second embodiment comprises a noise level estimator configured to estimate a noise level for a current frame using a linear prediction coefficient of at least one previous frame to obtain a noise level information and a noise inserter configured to add a noise to the current frame in dependence on the noise level information provided by the noise level estimator. The noise inserter is configured to add the noise to the current frame under the condition that the bitrate of the encoded audio information is smaller than 0.5 bit per sample. Furthermore, the noise inserter is configured to add the noise to the current frame under the condition that the current frame is a speech frame. Thus, again, noise may be added to the current frame in order to improve the overall sound quality of the decoded audio information which may be impaired due to coding artifacts, especially with regards to background noise of speech information. When the noise level of the noise is adjusted in view of the noise level of at least one previous audio frame, the overall sound quality may be improved without depending on side information in the bitstream. Thus, the amount of data to be transferred with the bit-stream may be reduced.

Figure 4:
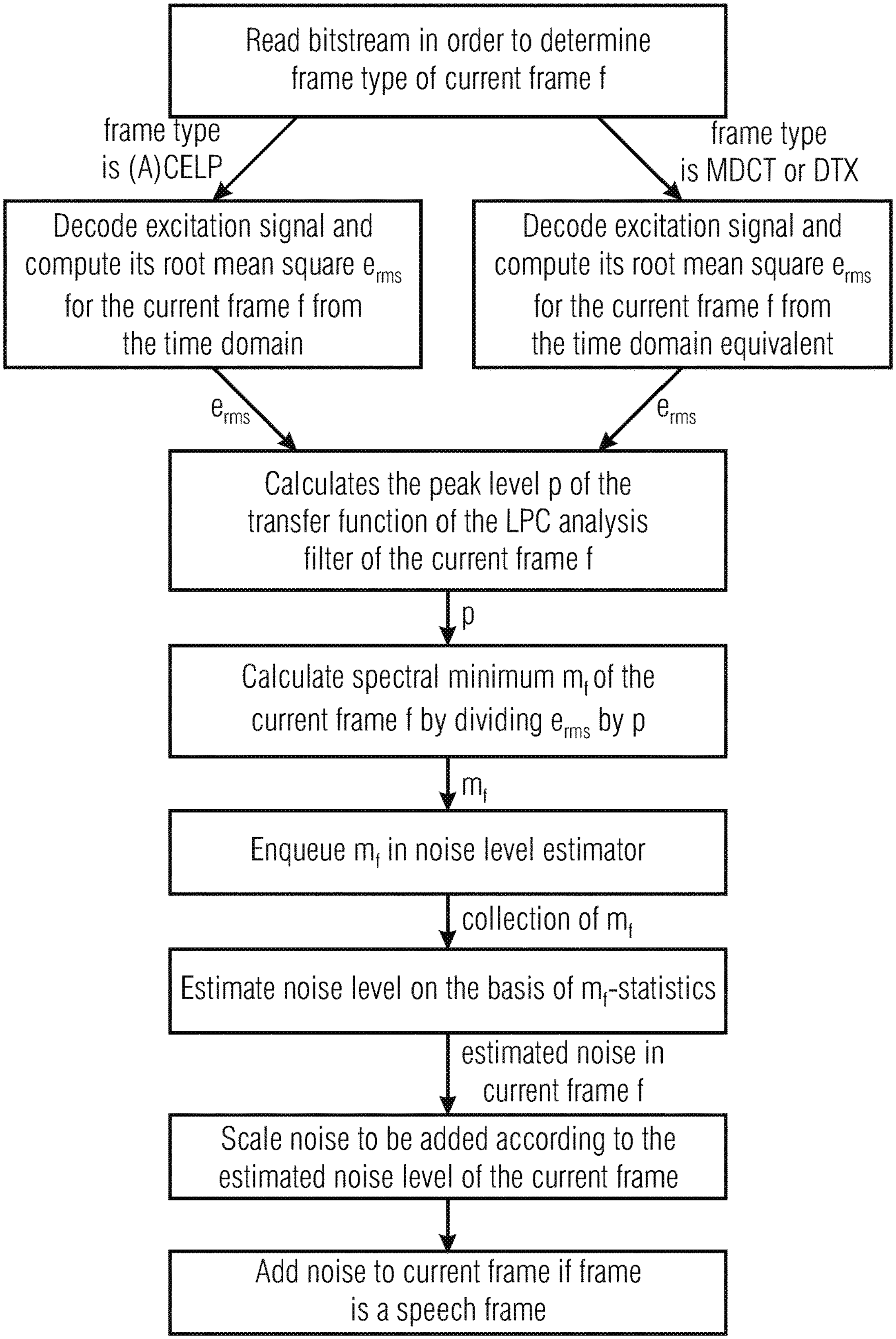
FIG. 4 shows a second method for performing audio decoding according to the present invention which can be performed by an audio decoder according to FIG. 3.
Figure 9:
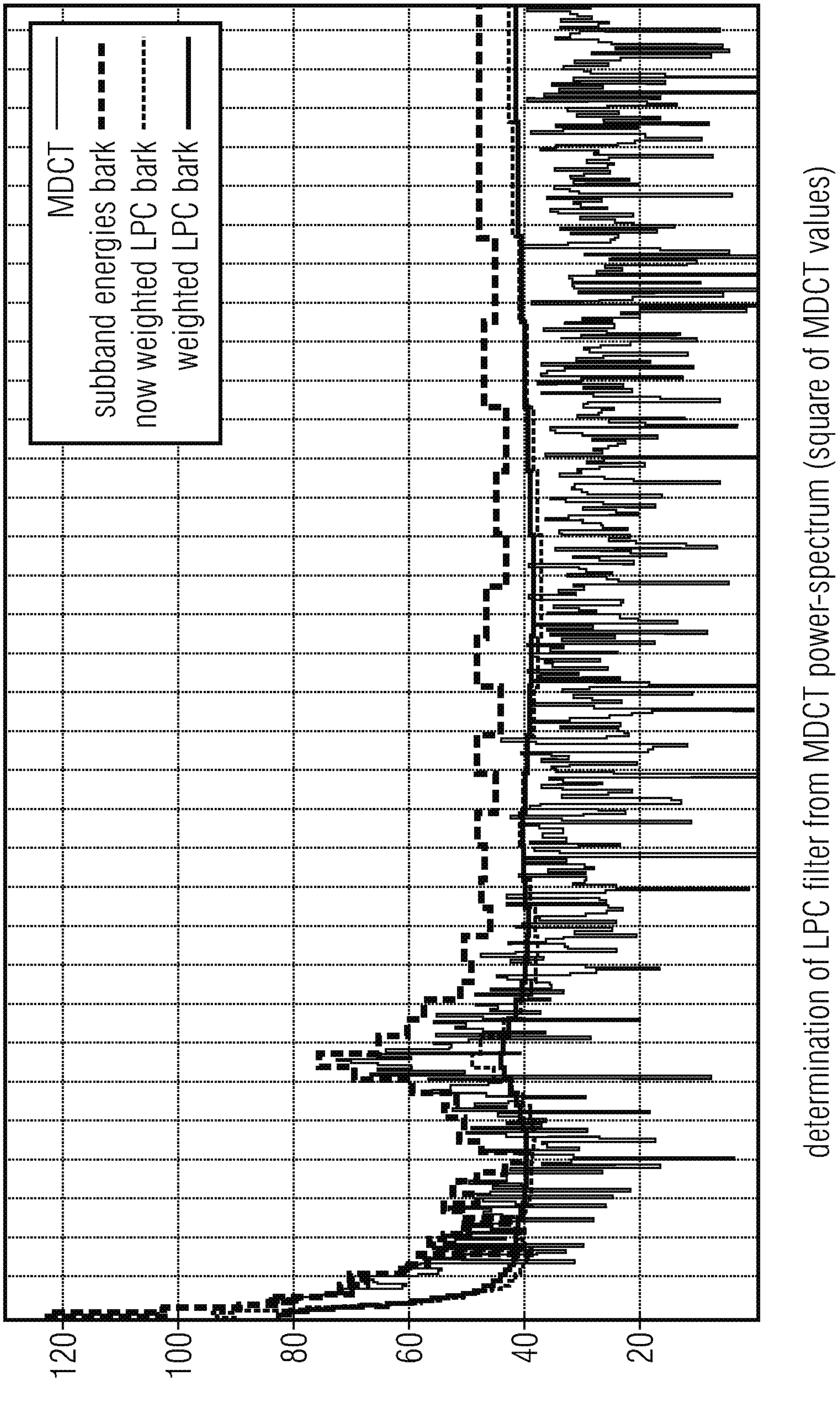
FIG. 9 shows a diagram illustrating how LPC filter equivalents are determined from a MDCT power-spectrum.

FIG. 4 shows a second method for performing audio decoding according to the present invention which can be performed by an audio decoder according to FIG. 3. Technical details of the audio decoder depicted in FIG. 3 are described along with the method features. According to FIG. 4, the audio decoder is configured to read the bitstream in order to determine the frame type of the current frame. Furthermore, the audio decoder comprises a frame type determinator for determining a frame type of the current frame, the frame type determinator being configured to identify whether the frame type of the current frame is speech or general audio, so that the noise level estimation can be performed depending on the frame type of the current frame. In general, the audio decoder is adapted to compute a first information representing a spectrally unshaped excitation of the current frame and to compute a second information regarding spectral scaling of the current frame to compute a quotient of the first information and the second information to obtain the noise level information. For example, if the frame type is ACELP, which is a speech frame type, the audio decoder decodes an excitation signal of the current frame and computes its root mean square $e_{rms}$ for the current frame f from the time domain representation of the excitation signal. This means, that the audio decoder is adapted to decode an excitation signal of the current frame and to compute its root mean square $e_{rms}$ from the time domain representation of the current frame as the first information to obtain the noise level information under the condition that the current frame is of a speech type. In another case, if the frame type is MDCT or DTX, which is a general audio frame type, the audio decoder decodes an excitation signal of the current frame and computes its root mean square $e_{rms}$ for the current frame f from the time domain representation equivalent of the excitation signal. This means, that the audio decoder is adapted to decode an unshaped MDCT-excitation of the current frame and to compute its root mean square $e_{rms}$ from the spectral domain representation of the current frame as the first information to obtain the noise level information under the condition that the current frame is of a general audio type. How this is done in detail is described in WO 2012/110476 A1. Furthermore, FIG. 9 shows a diagram illustrating how an LPC filter equivalent is determined from a MDCT power-spectrum. While the depicted scale is a Bark scale, the LPC coefficient equivalents may also be obtained from a linear scale. Especially when they are obtained from a linear scale, the calculated LPC coefficient equivalents are very similar to those calculated from the time domain representation of the same frame, for example when coded in ACELP.

Figure 7A:
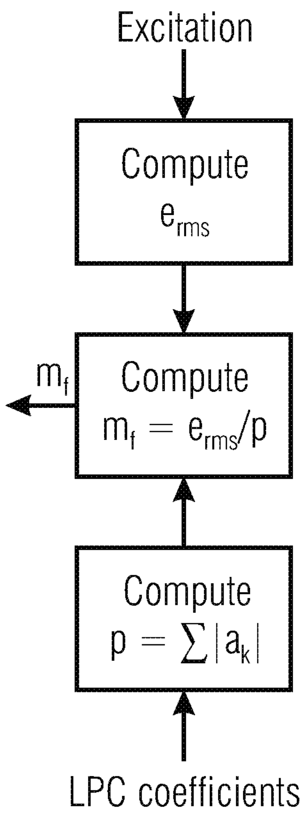
FIGS. 7*a*-7*c* shows an illustration of a method for calculating spectral minima $m_f$ for noise level estimations.
Figure 7B:
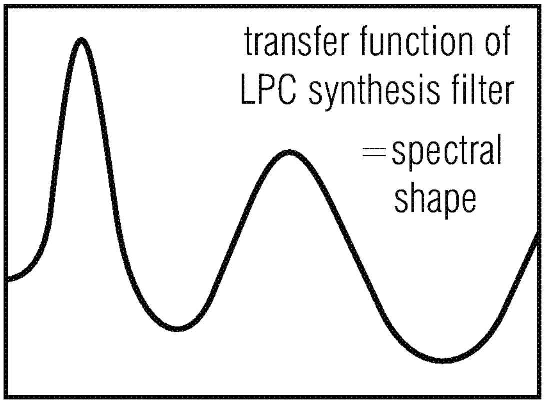
Figure 7C:
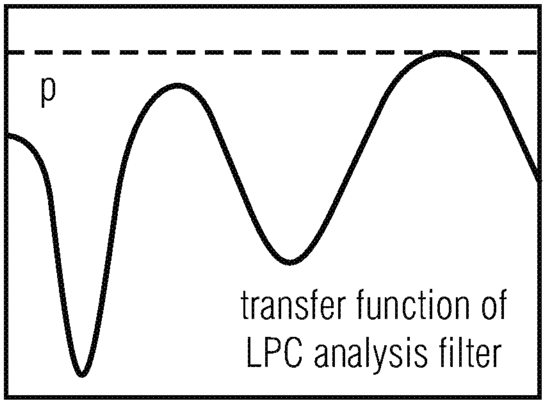

In addition, the audio decoder according to FIG. 3, as illustrated by the method chart of FIG. 4, is adapted to compute a peak level p of a transfer function of an LPC filter of the current frame as a second information, thus using a linear prediction coefficient to obtain the noise level information under the condition that the current frame is of a speech type. That means, the audio decoder calculates the peak level p of the transfer function of the LPC analysis filter of the current frame f according to the formula $p=\Sigma|a_k|$, wherein $a_k$ is a linear prediction coefficient with $k=0 \ldots 15$. If the frame is a general audio frame, the LPC coefficient equivalents are obtained from the spectral domain representation of the current frame, as shown in FIG. 9 and described in WO 2012/110476 A1 and above. As seen in FIG. 4, after calculating the peak level p, a spectral minimum $m_f$ of the current frame f is calculated by dividing $e_{rms}$ by p. Thus, The audio decoder is adapted to compute a first information representing a spectrally unshaped excitation of the current frame, in this embodiment $e_{rms}$, and a second information regarding spectral scaling of the current frame, in this embodiment peak level p, to compute a quotient of the first information and the second information to obtain the noise level information. The spectral minimum of the current frame is then enqueued in the noise level estimator, the audio decoder being adapted to enqueue the quotient obtained from the current audio frame in the noise level estimator regardless of the frame type and the noise level estimator comprising a noise level storage for two or more quotients, in this case spectral minima $m_f$, obtained from different audio frames. More specifically, the noise level storage can store quotients from 50 frames in order to estimate the noise level. Furthermore, the noise level estimator is adapted to estimate the noise level on the basis of statistical analysis of two or more quotients of different audio frames, thus a collection of spectral minima $m_f$. The steps for computing the quotient $m_f$ are depicted in detail in FIG. 7, illustrating the calculation steps that may be used. In the second embodiment, the noise level estimator operates based on minimum statistics as known from [3]. The noise is scaled according to the estimated noise level of the current frame based on minimum statistics and after that added to the current frame if the current frame is a speech frame. Finally, the current frame is de-emphasized (not shown in FIG. 4). Thus, this second embodiment also allows to omit side information for noise filling, allowing to reduce the amount of data to be transferred with the bitstream. Accordingly, the sound quality of the audio information may be improved by enhancing the background noise during the decoding stage without increasing the data rate. Note that since no time/frequency transforms are necessary and since the noise level estimator is only run once per frame (not on multiple sub-bands), the described noise filling exhibits very low complexity while being able to improve low-bit-rate coding of noisy speech.

Figure 5:
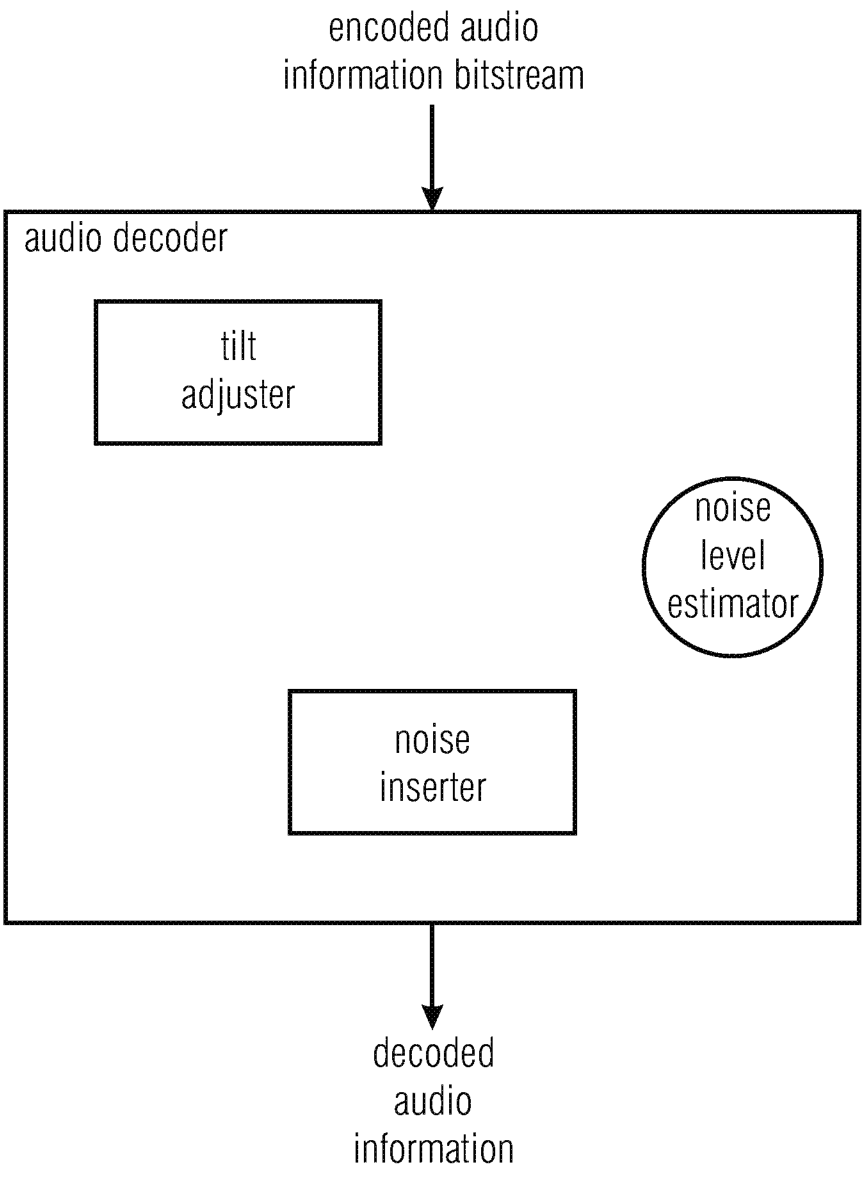
FIG. 5 shows a third embodiment of an audio decoder according to the present invention.

FIG. 5 shows a third embodiment of an audio decoder according to the present invention. The audio decoder is adapted to provide a decoded audio information on the basis of an encoded audio information. The audio decoder is configured to use a coder based on LD-USAC in order to decode the encoded audio information. The encoded audio information comprises linear prediction coefficients (LPC), which may be individually designated as coefficients $a_k$. The audio decoder comprises a tilt adjuster configured to adjust a tilt of a noise using linear prediction coefficients of a current frame to obtain a tilt information and a noise level estimator configured to estimate a noise level for a current frame using a linear prediction coefficient of at least one previous frame to obtain a noise level information. Furthermore, the audio decoder comprises a noise inserter configured to add the noise to the current frame in dependence on the tilt information obtained by the tilt calculator and in dependence on the noise level information provided by the noise level estimator. Thus, noise may be added to the current frame in order to improve the overall sound quality of the decoded audio information which may be impaired due to coding artifacts, especially with regards to background noise of speech information, in dependence on the tilt information obtained by the tilt calculator and in dependence on the noise level information provided by the noise level estimator. In this embodiment, a random noise generator (not shown) which is comprised by the audio decoder generates a spectrally white noise, which is then both scaled according to the noise level information and shaped using the g-derived tilt, as described earlier.

Figure 6:
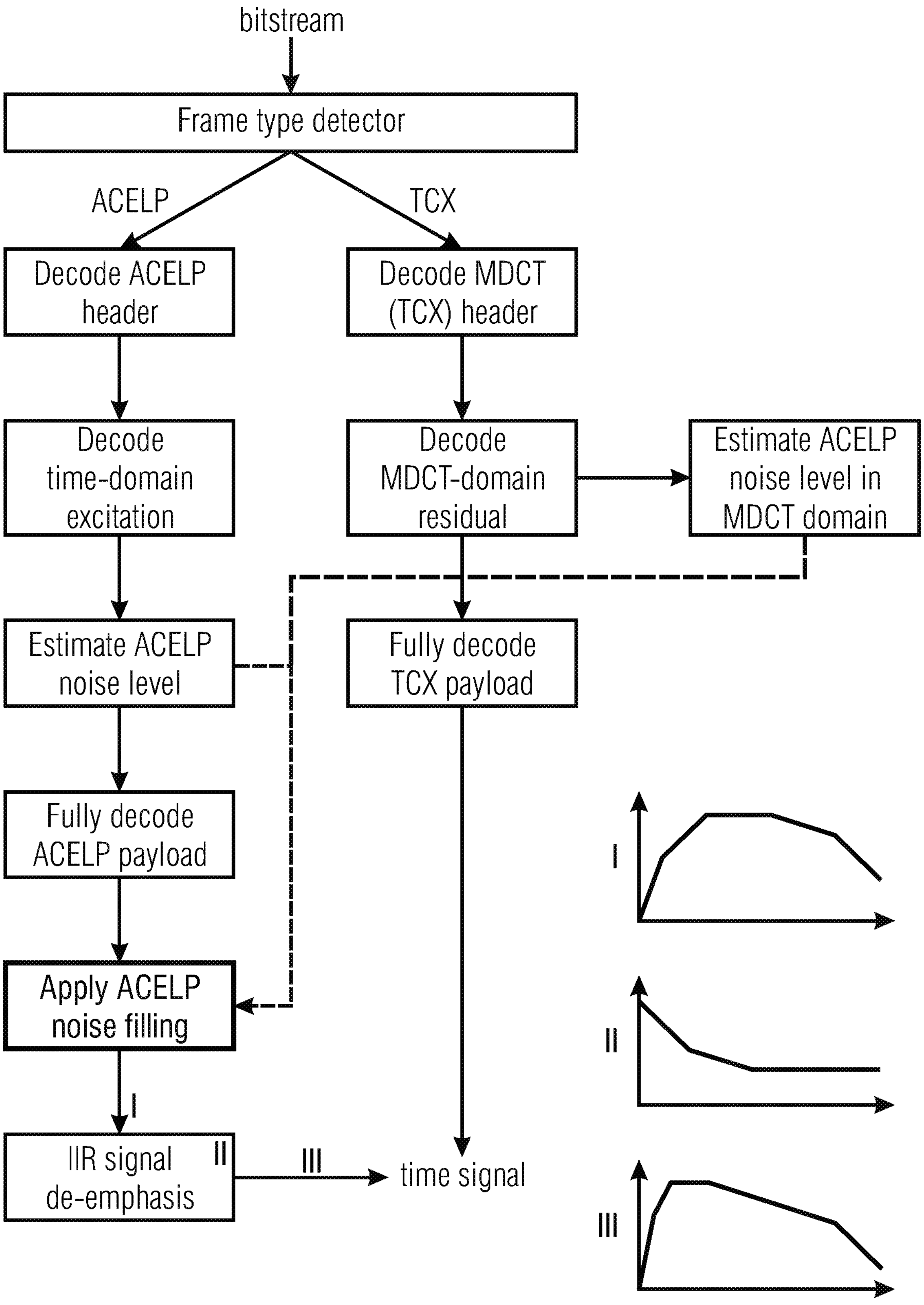
FIG. 6 shows a third method for performing audio decoding according to the present invention which can be performed by an audio decoder according to FIG. 5.

FIG. 6 shows a third method for performing audio decoding according to the present invention which can be performed by an audio decoder according to FIG. 5. The bitstream is read and a frame type determinator, called frame type detector, determines whether the current frame is a speech frame (ACELP) or general audio frame (TCX/MDCT). Regardless of the frame type, the frame header is decoded and the spectrally flattened, unshaped excitation signal in perceptual domain is decoded. In case of speech frame, this excitation signal is a time-domain excitation, as described earlier. If the frame is a general audio frame, the MDCT-domain residual is decoded (spectral domain). Time domain representation and spectral domain representation are respectively used to estimate the noise level as illustrated in FIG. 7 and described earlier, using LPC coefficients also used to decode the bitstream instead of using any side information or additional LPC coefficients. The noise information of both types of frames is enqueued to adjust the tilt and noise level of the noise to be added to the current frame under the condition that the current frame is a speech frame. After adding the noise to the ACELP speech frame (Apply ACELP noise filling) the ACELP speech frame is de-emphasized by a IIR and the speech frames and the general audio frames are combined in a time signal, representing the decoded audio information. The steep high-pass effect of the de-emphasis on the spectrum of the added noise is depicted by the small inserted Figures I, II, and III in FIG. 6.

In other words, according to FIG. 6, the ACELP noise filling system described above was implemented in the LD-USAC (EVS) decoder, a low delay variant of xHE-AAC [6] which can switch between ACELP (speech) and MDCT (music/noise) coding on a per-frame basis. The insertion process according to FIG. 6 is summarized as follows:

1. The bitstream is read, and it is determined whether the current frame is an ACELP or MDCT or DTX frame. Regardless of the frame type, the spectrally flattened excitation signal (in perceptual domain) is decoded and used to update the noise level estimate as described below in detail. Then the signal is fully reconstructed up to the de-emphasis, which is the last step.
2. If the frame is ACELP-coded, the tilt (overall spectral shape) for the noise insertion is computed by first-order LPC analysis of the LPC filter coefficients. The tilt is derived from the gain g of the 16 LPC coefficients $a_k$, which is given by $g=\Sigma[a_k \cdot a_{k+1}]/\Sigma[a_k \cdot a_k]$.
3. If the frame is ACELP-coded, the noise shaping level and tilt are employed to perform the noise addition onto the decoded frame: a random noise generator generates the spectrally white noise signal, which is then scaled and shaped using the g-derived tilt.
4. The shaped and leveled noise signal for the ACELP frame is added onto the decoded signal just before the final de-emphasis filtering step. Since the de-emphasis is a first order IIR boosting low frequencies, this allows for low-complexity, steep IIR high-pass filtering of the added noise, as in FIG. 6, avoiding audible noise artifacts at low frequencies.

The noise level estimation in step 1 is performed by computing the root mean square $e_{rms}$ of the excitation signal for the current frame (or in case of an MDCT-domain excitation the time domain equivalent, meaning the $e_{rms}$ which would be computed for that frame if it were an ACELP frame) and by then dividing it by the peak level p of the transfer function of the LPC analysis filter. This yields the level $m_f$ of the spectral minimum of frame f as in FIG. 7. $m_f$ is finally enqueued in the noise level estimator operating based on e.g. minimum statistics [3]. Note that since no time/frequency transforms are necessary and since the level estimator is only run once per frame (not on multiple sub-bands), the described CELP noise filling system exhibits very low complexity while being able to improve low-bitrate coding of noisy speech.

Although some aspects have been described in the context of an audio decoder, it is clear that these aspects also represent a description of the corresponding method, where a block or device corresponds to a method step or a feature of a method step. Analogously, aspects described in the context of a method step also represent a description of a corresponding block or item or feature of a corresponding audio decoder. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF CITED NON-PATENT LITERATURE

[1] B. Bessette et al., "The Adaptive Multi-rate Wideband Speech Codec (AMR-WB)," IEEE Trans. On Speech and Audio Processing, Vol. 10, No. 8, November 2002.
[2] R. C. Hendriks, R. Heusdens and J. Jensen, "MMSE based noise PSD tracking with low complexity," in IEEE Int. Conf. Acoust., Speech, Signal Processing, pp. 4266-4269, March 2010.
[3] R. Martin, "Noise Power Spectral Density Estimation Based on Optimal Smoothing and Minimum Statistics," IEEE Trans. On Speech and Audio Processing, Vol. 9, No. 5, July 2001.
[4] M. Jelinek and R. Salami, "Wideband Speech Coding Advances in VMR-WB Standard," IEEE Trans. On Audio, Speech, and Language Processing, Vol. 15, No. 4, May 2007.
[5] J. Mäkinen et al., "AMR-WB+: A New Audio Coding Standard for 3rd Generation Mobile Audio Services," in Proc. ICASSP 2005, Philadelphia, USA, March 2005.
[6] M. Neuendorf et al., "MPEG Unified Speech and Audio Coding—The ISO/MPEG Standard for High-Efficiency Audio Coding of All Content Types," in Proc. 132nd AES Convention, Budapest, Hungary, April 2012. Also appears in the Journal of the AES, 2013.
[7] T. Vaillancourt et al., "ITU-T EV-VBR: A Robust 8-32 kbit/s Scalable Coder for Error Prone Telecommunications Channels," in Proc. EUSIPCO 2008, Lausanne, Switzerland, August 2008.

The invention claimed is:

1. An audio decoder for providing a decoded audio information on the basis of an encoded audio information comprising linear prediction coefficients (LPC), the audio decoder comprising:

a tilt adjuster configured to adjust a tilt of a noise, wherein the tilt adjuster is configured to use linear prediction coefficients of a current frame to acquire a tilt information; and a decoder core configured to decode an audio information of the current frame using the linear prediction coefficients of the current frame to acquire a decoded core coder output signal; and a noise inserter configured to add the adjusted noise to the current frame, wherein the tilt adjuster is configured to obtain the tilt information using a calculation of a gain g of the linear prediction coefficients of the current frame, wherein $g=\Sigma(ak\cdot ak+1)/\Sigma(ak\cdot ak)$, wherein ak is a linear prediction coefficient of the current frame, located at LPC index k, wherein the audio decoder is implemented using a hardware apparatus, or using a computer, or using a combination of a hardware apparatus and a computer.

2. The audio decoder according to claim 1, wherein the audio decoder comprises a frame type determinator for determining a frame type of the current frame, the frame type determinator being configured to activate the tilt adjuster to adjust the tilt of the background noise when the frame type of the current frame is detected to be of a speech type.

3. The audio decoder according to claim 1, wherein the tilt adjuster is configured to use a result of a first-order analysis of the linear prediction coefficients of the current frame to acquire the tilt information.

4. The audio decoder according to claim 3, wherein the tilt adjuster is configured to acquire the tilt information using a calculation of a gain g of the linear prediction coefficients of the current frame as the first-order analysis.

5. The audio decoder according to claim 1, wherein the audio decoder furthermore comprises:

a noise level estimator configured to estimate a noise level for a current frame using a plurality of linear prediction coefficient of at least one previous frame to acquire a noise level information; —wherein the noise inserter configured to add the background noise to the current frame in dependence on the noise level information provided by the noise level estimator;

wherein the audio decoder is adapted to decode an excitation signal of the current frame and to compute its root mean square $e_{rms}$;

wherein the audio decoder is adapted to compute a peak level p of a transfer function of an LPC filter of the current frame;

wherein the audio decoder is adapted to compute a spectral minimum mf of the current audio frame by computing the quotient of the root mean square $e_{rms}$ and the peak level p to acquire the noise level information;

wherein the noise level estimator is adapted to estimate the noise level on the basis of two or more quotients of different audio frames.

6. The audio decoder according to claim 1, wherein the audio decoder comprises a de-emphasis filter to de-emphasize the current frame, the audio decoder being adapted to applying the de-emphasis filter on the current frame after the noise inserter added the noise to the current frame.

7. The audio decoder according to claim 1, wherein the audio decoder comprises a noise generator, the noise generator being adapted to generate the noise to be added to the current frame by the noise inserter.

8. The audio decoder according to claim 1, wherein the audio decoder comprises a noise generator configured to generate random white noise.

9. The audio decoder according to claim 1, wherein the audio decoder is configured to use a decoder based on one or more of the decoders AMR-WB, G.718 or LD-USAC (EVS) in order to decode the encoded audio information.

10. An audio decoder for providing a decoded audio information on the basis of an encoded audio information comprising linear prediction coefficients (LPC), the audio decoder comprising:

a noise inserter configured to add a noise to the current frame in dependence on a noise level information;

wherein the audio decoder is adapted to decode an excitation signal of the current frame and to compute its root mean square $e_{rms}$;

wherein the audio decoder is adapted to compute a peak level p of a transfer function of an LPC filter of the current frame;

wherein the audio decoder is adapted to compute a spectral minimum mf of the current audio frame by computing the quotient of the root mean square $e_{rms}$ and the peak level p to acquire the noise level information;

wherein the noise level estimator is adapted to estimate the noise level on the basis of two or more quotients of different audio frames;

wherein the audio decoder comprises a decoder core configured to decode an audio information of the current frame using linear prediction coefficients of the current frame to acquire a decoded core coder output signal and wherein the noise inserter adds the noise depending on linear prediction coefficients used in decoding the audio information of the current frame and used in decoding the audio information of one or more previous frames, wherein the audio decoder is implemented using a hardware apparatus, or using a computer, or using a combination of a hardware apparatus and a computer.

11. The audio decoder according to claim 10, wherein the audio decoder comprises a frame type determinator for determining a frame type of the current frame, the frame type determinator being configured to identify whether the frame type of the current frame is speech or general audio, so that the noise level estimation can be performed depending on the frame type of the current frame.

12. The audio decoder according to claim 10, wherein the audio decoder is adapted to compute the root mean square $e_{rms}$ of the current frame from the time domain representation of the current frame to acquire the noise level information under the condition that the current frame is of a speech type.

13. The audio decoder according to claim 10, wherein the audio decoder is adapted to decode an unshaped MDCT-excitation of the current frame and to compute its root mean square $e_{rms}$ from the spectral domain representation of the current frame to acquire the noise level information if the current frame is of a general audio type.

14. The audio decoder according to claim 10, wherein the audio decoder is adapted to enqueue the quotient acquired from the current audio frame in the noise level estimator regardless of the frame type, the noise level estimator comprising a noise level storage for two or more quotients acquired from different audio frames.

15. The audio decoder according to claim 10, wherein the noise level estimator is adapted to estimate the noise level on the basis of statistical analysis of two or more quotients of different audio frames.

16. A method for providing a decoded audio information on the basis of an encoded audio information comprising linear prediction coefficients (LPC), the method comprising:

adjusting a tilt of a noise, wherein linear prediction coefficients of a current frame are used to acquire a tilt information; and decoding an audio information of the current frame using the linear prediction coefficients of the current frame to acquire a decoded core coder output signal; and adding the adjusted noise to the current frame, wherein the tilt information is obtained using a calculation of a gain g of the linear prediction coefficients of the current frame, wherein $g=\Sigma(ak\cdot ak+1)/\Sigma(ak\cdot ak)$, wherein ak is a linear prediction coefficient of the current frame, located at LPC index k.

17. The method according to claim 16, wherein the method is executed by a computer program running on a computer.

18. A method for providing a decoded audio information on the basis of an encoded audio information comprising linear prediction coefficients (LPC), the method comprising:

adding a noise to the current frame in dependence on a noise level information;

wherein an excitation signal of the current frame is decoded and wherein its root mean square $e_{rms}$ is computed;

wherein a peak level p of a transfer function of an LPC filter of the current frame is computed;

wherein a spectral minimum mf of the current audio frame is computed by computing the quotient of the root mean square $e_{rms}$ and the peak level p to acquire the noise level information;

wherein the noise level is estimated on the basis of two or more quotients of different audio frames;

wherein the method comprises decoding an audio information of the current frame using linear prediction coefficients of the current frame to acquire a decoded core coder output signal and wherein the method comprises adding the noise depending on linear prediction coefficients used in decoding the audio information of the current frame and used in decoding the audio information of one or more previous frames, wherein the method is performed using a hardware apparatus, or using a computer, or using a combination of a hardware apparatus and a computer.

19. The method according to claim 18, wherein the method is executed by a computer program running on a computer.

* * * * *